United States Patent [19]

Palvarini et al.

[11] 4,243,703
[45] Jan. 6, 1981

[54] PESTICIDE-CONTAINING PLASTIC COVERINGS FOR AGRICULTURAL CULTIVATIONS, AND PROCESS FOR OBTAINING SAID COVERINGS AND FOR PROTECTING THE CULTIVATIONS FROM INFESTANT PESTS

[75] Inventors: Attilio Palvarini, Menaggio; Simone Lorusso, S. Giuliano Milanese; Angelo Longoni, Milan, all of Italy

[73] Assignee: Montedison S.p.A., Milan, Italy

[21] Appl. No.: 968,565

[22] Filed: Dec. 11, 1978

Related U.S. Application Data

[63] Continuation of Ser. No. 783,270, Mar. 31, 1977, abandoned.

[30] Foreign Application Priority Data

Apr. 1, 1976 [IT] Italy ............................ 21835 A/76

[51] Int. Cl.³ .................... B05D 5/00; A01G 13/02; B32B 33/00
[52] U.S. Cl. .............................. 427/276; 47/9; 428/195; 428/198; 428/411; 428/542; 428/543; 428/907
[58] Field of Search ............... 428/907, 411, 542, 543, 428/195, 198; 47/9; 427/256, 275, 276

[56] References Cited

U.S. PATENT DOCUMENTS

| | | | |
|---|---|---|---|
| 2,523,114 | 9/1950 | Hawley | 428/907 X |
| 2,541,678 | 2/1951 | Swaney et al. | 428/907 X |
| 2,544,732 | 2/1951 | Schechmeister | 428/907 X |
| 2,596,377 | 5/1952 | Derman | 428/907 X |
| 3,380,848 | 4/1968 | Horowitz | 428/907 X |
| 3,857,934 | 12/1974 | Bernstein et al. | 424/30 |
| 3,938,280 | 2/1976 | Vandemark | 47/9 |
| 3,984,940 | 10/1976 | Reich et al. | 47/9 |
| 4,008,351 | 2/1977 | Inoue et al. | 428/411 |

*Primary Examiner*—Harold Ansher

[57] ABSTRACT

Plastic films containing pesticides and useful as coverings for agricultural cultivations which also effectively protect the cultivations from both vegetable and animal pests (parasites) are disclosed, as are methods for obtaining and using the coverings.

4 Claims, No Drawings

PESTICIDE-CONTAINING PLASTIC COVERINGS FOR AGRICULTURAL CULTIVATIONS, AND PROCESS FOR OBTAINING SAID COVERINGS AND FOR PROTECTING THE CULTIVATIONS FROM INFESTANT PESTS

This is a continuation of application Ser. No. 783,270 field Mar. 31, 1977 (now abandoned).

THE PRIOR ART

It is known to cover up agricultural cultivations with films of plastic material in order to protect said cultivations from atmospheric agents. For such a purpose it is possible to realize various types of coverings with plastic films, for instance arranged in the form of tunnels or stretched out directly onto the planted soil. Such coverings, however, have the disadvantage of protecting not only the useful cultivation but also parasites and infesting insects. Moreover, the large amount of moisture which forms on the inside of the covering and in the interspace between the covering and the soil, may promote the growth of poisonous fungi.

Such drawbacks are obivated by the help of traditional treatments with pesticides, both before the covering is put in place as well as during the period in which the cultivation is to be protected, applied directly to the soil.

In the first case, there is a heavy dispersion of the pesticide or pesticides, inasmuch as only a minimal part of it attains the prefixed "target" in a useful stretch of time in order to obtain the desired effect.

In the second case, if the dimensions of the covering do not allow access to the cultivations, it is necessary to uncover same each time by a manual operation or, if the space does allow it, it is necessary to carry out the applications underneath the cover, with all the consequential risks of intoxication for the operating land worker.

Moreover, in order to effectively protect the cultivation, various different treatments at different periods and with different types of pesticides, are necessary.

THE PRESENT INVENTION

One object of this invention is to provide means for avoiding the aforesaid disadvantages and drawbacks of the prior art.

This and other objects which will become apparent hereinafter are accomplished by the present invention and in accordance with our finding that agricultural cultivations protected by plastic coverings or films can be effectively protected from both vegetable and animal pests (parasites) if the coverings or films are treated, at least on the face thereof to be placed in contact with the cultivation, with one or more pesticides in a quantity comprised between 0.2 and 10 kg/ha of soil covered for each pesticide used.

Spreading of the pesticide or pesticides may be carried out either on the whole surface of the film or on only part of it in the form of strips or "spots", and may be realized either while producing the film itself or "on the field" by using suitable equipment and employing suitable formulations of pesticide or pesticides.

It is also possible to use solutions of the pesticide or pesticides and deposit same by spreading, brushing, by means of dosing devices, motor pumps or distributors, atomizers in the presence of suitable propellants or in a current of air or other gas. It is possible to use emulsions obtained by diluting with water solutions of the pesticide or pesticides in hydrosoluble solvents in the presence of surfactants, in suitable homogenizers.

It is also possible—and this is a presently preferred embodiment of the invention—to formulate the pesticide or pesticides by dispersing them homogeneously in spreadable pastes or in hydropermeable varnishes, and to then apply such pastes or varnishes on the surface of the film turned towards the cultivation.

If liquid products are involved, they can be spread as such, in the presence or absence of wetting agents, dispersants and surfactants.

We have found that using the above-described system no further treatments are necessary in the cultivation cycle, inasmuch as there is a constant distribution of pesticide or pesticides in time, and that the quantities of pesticide or pesticides can be reduced to below the optimal quantities per hectare, without thereby reducing the protection.

This apparently is due to the localized and more prolonged action of the active principles (the pesticide or pesticides) on the cultivation, and a more homogeneous distribution over the whole cultivation, also because of the continuous condensing of moisture on the faces of the film during the night when the outside temperature is lower than that of the soil, and the subsequent dropping to the soil of the condensate and its dripping onto the leaves, carrying along with it said active principles.

The following examples are given to illustrate the invention in more detail and are not intended to be limiting.

EXAMPLE 1

A 150 $\mu$ thick polyethylene film, 3 mt wide and 50 mt long, was treated in the following way:

On both sides of the longitudinal center line and at a distance of 10 cm therefrom, there was brushed on a ten centimeter wide strip of the same length as the film a paste obtained by homogenizing in polyethylene-glycol 400, at 50° C., Rogor [methylamide of S(O,O-dimethyldithiophosphoryl) acetic acid]; using 5 lt polyethyleneglycol 400 containing 1 g of Rogor and calculating that the thickness of the strip is 1 mm, one gets 200 mg/sq.mt.

Another paste, obtained by homogenizing at 50° C., 5 cu. mm of Ditalimfos (O,O-diethylphthalimido-phosphonothioate) in 5 lt of polyethylenglycol 400, was brushed on the other side of the center line. (If the thickness of the paste is 1 mm, it is calculated that there will be 1 cu.mm/sq.mt.)

The polyethylene film was put up in the form of a tunnel (base=1 mt) on one row or cucumber plants preliminarily sprinkled on the upper leaf face with a suspension of *Sphaerotheca fulginea conidia* (200,000 conidia/cu.cm) and was infested with adult *Trialeurodes vaporariorum*.

After incubation of the fungus for 8–10 days, the intensity of the attack by the fungus as well as the intensity of the attack by the insect, were evaluated according to a scale that ranges from 100—100 (for plant neither attacked by the Sphearotheca nor by the Aleurodes) to 0—0 (for a plant attacked by both pests).

The results are recorded in Table I.

TABLE 1

| Product | Species | Protection index after days | | | | |
|---|---|---|---|---|---|---|
| | | 15 | 30 | 45 | 60 | 75 |
| Rogor (200 mg/sq.mt) | Trialeurodes Vaporariorum | 100 | 100 | 100 | 100 | 100 |

TABLE 1-continued

| Product | Species | Protection index after days | | | | |
|---|---|---|---|---|---|---|
| | | 15 | 30 | 45 | 60 | 75 |
| Ditalimfos (1 cu.mm/sq.m) | Sphaerotheca fulginea | 100 | 100 | 100 | 100 | 100 |
| Witness plant | | 0—0 | 0—0 | 0—0 | 0—0 | 0—0 |

EXAMPLE 2

Plants infested with acari and insects of different species of agricultural interest (see Table II) were kept under a tunnel-shaped covering of a 70 μ thick polyethylene film, with a covered up volume of 2 cu.mt. (h=60 cm; length=3.60 mt), the inner walls of the covering having been preliminarily sprinkled, at regular intervals, by means of a suitable dispenser, with 200 drops of 1 cu.mm/sq.mt of the product under examination.

In another set of identical tunnels that had not been treated, the phytophagi present on the plants, at the end of the test, appeared to be perfectly vital (disinfecting action equal to 0).

The results (expressed in terms of percentual mortality), checked after 5 days from the start of the test, are shown in Table II.

TABLE II

| | | Phytophagi and Interesting Cultivations | | | | |
|---|---|---|---|---|---|---|
| Product | Applied dose ml/sq.mt | Macrosiphum euphorbiae (mixed population) on potato plant | Pieris brassicae (larvae) on cauliflower | Spodoptera littoralis (larvae) on castor-oil plant | Leptinotarsa decemlineata (larvae) on potato plant | Tetranychus urticae (adults) on bean plant |
| Diazinone (O,O-diethyl-0-2-isopropyl-6-methyl-pyrimidin-4-yl phosphorothioate) | 200 | 100 | 100 | 100 | 100 | 100 |
| Dichlorvos (2,2-dichlorovinyl-dimethyl-phosphate) at a 1.5% concentration in a plasticizer (*) | 200 | 100 | 100 | 100 | 100 | 100 |
| Witness | 0 | 0 | 0 | 0 | 0 | 0 |

No symptom of phytotoxicity was observed on the plants under test.
(*) Plasticizer: epoxidized soya oil.

EXAMPLE 3

The leaves of cucumber plants cv. Marketer were uniformly sprinkled, on their upper face, with an aqueous suspension of conidia of Sphaerotheca fulginea (200,000 conidia per cc.). After 24 or 48 hours, said plants were put under a polyethylene tunnel (volume 2 cu.mt; h=0.60 mt) on whose inside walls were previously applied at regular distances, by a suitable dispenser, 1000 drops of 1 cu.mm per sq.mt of the product under examination.

After an 8-10 days incubation, the intensity of the infection was estimated by sight, using indexes of a value scale that goes from 0 (for a healthy plant) to 100 (for a completely infested one).

The results of the tests are recorded in Table III.

TABLE III

| Product | Applied dose ml/m² | Infection index after days | | | | |
|---|---|---|---|---|---|---|
| | | 15 | 30 | 45 | 60 | 75 |
| Ditalimfos (O,O-diethyl-phthalimido phosphonothioate) at a 20% concentration in a plasticizer (*) | 1000 | 0 | 0 | 0 | 0 | 0 |
| Witness | 0 | 100 | 100 | 100 | 100 | 100 |

No symptoms of phytotoxicity have been observed on the plants under test.
(*) Plasticizer: epoxidized soya oil.

EXAMPLE 4

On a number of lots of soil of average composition and sized 1×1 mt, were sown the following infesting plants: Convolvolus arvensis, Echinochloa crus galli, Stellaria media, Galinsoga parviflora, Setaria glauca, Convolvolus sepium, Digitaria sanguinalis, Panicum dichotomiflorum, Solanum nigrum.

On said soil lots were then spread, in direct contact with the soil, transparent, 70 μ thick polyethylene films on whose lower face had been applied preceedingly, at regular distances and by means of a suitable dispenser, 200 drops of 1 mm³ per sq.mt of the product under examination.

Untreated films were placed on the witness soil lots.

The necessary humidity or moisture for the development of the infesting plants was supplied by lateral infiltrations.

The evaluation of the results, carried out 30 days after the seeding, was realized by attributing a value scale going from 0 to 4 for each infesting plant in which 0=no activity, 4=total activity.

The results are recorded in Table IV.

TABLE IV

| Product | Applied dose ml/m² | Convolvolus arvensis | Convolvolus sepium | Echinochloa crusgalli | Stellaria media | Galinsoga parviflora | Setaria glauca | Digitaria sanguinalis | Panicum dichotomiflorum | Solanum nigrum |
|---|---|---|---|---|---|---|---|---|---|---|
| Trifluralin (2,6-dinitro-N,N-dipropyl-4-trifluoromethylaniline) at 25% concentration | | | | | | | | | | |

TABLE IV-continued

| Product | Applied dose ml/m² | Convolvolus arvensis | Convolvolus sepium | Echinochloa crusgalli | Stellaria media | Galinsoga parviflora | Setaria glauca | Digitaria sanguinalis | Panicum dichotomiflorum | Solanum nigrum |
| --- | --- | --- | --- | --- | --- | --- | --- | --- | --- | --- |
| in a plasticizer (*) | 200 | 4 | 4 | 4 | 4 | 4 | 4 | 4 | 4 | 4 |
| Witness | — | 0 | 0 | 0 | 0 | 0 | 0 | 0 | 0 | 0 |

(*) Plasticizer: epoxidized soya oil

We claim:

1. Method for protecting agricultural cultivations from infesting pests, which method consists in covering the cultivations with films of plastic material containing, in the surface facing the cultivation at least one pesticide in quantities corresponding to from 0.2 to 10 kg/ha of soil covered for each pesticide used and in a form such that the pesticide is caused to slowly migrate from the covering film to the cultivation and the soil in which it is grown.

2. Process for preparing films of plastic material for covering and protecting agricultural cultivations, which process comprises applying at least one pesticide to the surface of the film to be turned to the cultivation in quantities corresponding to from 0.2 to 10 kg/ha of covered soil for each pesticide used and in a form such that the pesticide slowly migrates from the covering film to the cultivation and the soil in which the cultivation is grown.

3. The method of covering and protecting agricultural cultivations which comprises covering the agricultural cultivation to be protected with a film of plastic material containing, on the surface thereof which is turned to the cultivation, at least one pesticide in quantities of from 0.2 to 10 kg/ha of covered soil for each pesticide used and in a form such that the pesticide or pesticides used is or are dissolved or suspended in the moisture under the film covering the soil.

4. The method of protecting an agricultural cultivation against infestation, which method consists in providing a tunnel-like covering over the cultivation and the soil in which the cultivation is grown, said tunnel-like covering consisting of a film of plastic material containing, on the surface thereof turned to the cultivation, at least one pesticide in a quantity of from 0.2 to 10 kg/ha of soil in which the cultivation is grown for each pesticide used and in a form such that the pesticide migrates from the surface of the tunnel-like covering through the air space between said covering and the agricultural cultivation to the cultivation and the soil in which the cultivation is grown.

* * * * *